United States Patent
Mehring et al.

[11] Patent Number: 6,055,467
[45] Date of Patent: Apr. 25, 2000

[54] APPARATUS FOR AUTOMATIC TRANSVERSE VEHICLE GUIDANCE ALONG A TRAFFIC LANE

[75] Inventors: Steffi Mehring, Steinkirchen; Uwe Franke, Uhingen, both of Germany

[73] Assignee: DaimlerChrysler AG, Stuttgart, Germany

[21] Appl. No.: 08/912,690

[22] Filed: Aug. 18, 1997

[30] Foreign Application Priority Data

Aug. 16, 1996 [DE] Germany ............... 196 32 929

[51] Int. Cl.[7] ............................................. G05D 1/00
[52] U.S. Cl. ........................ 701/23; 701/41; 701/93; 701/211; 701/214; 180/168
[58] Field of Search ........................ 701/23, 28, 38, 701/41, 82, 93, 211, 207, 214; 180/168, 170; 348/118

[56] References Cited

U.S. PATENT DOCUMENTS

| | | | |
|---|---|---|---|
| 4,088,939 | 5/1978 | Mitschke et al. | 180/168 |
| 4,176,728 | 12/1979 | Otteblad et al. | 180/168 |
| 5,163,002 | 11/1992 | Kurami | 701/300 |
| 5,234,070 | 8/1993 | Noah et al. | 701/50 |
| 5,289,893 | 3/1994 | Yamamoto et al. | 701/41 |
| 5,318,143 | 6/1994 | Parker et al. | 701/23 |
| 5,357,432 | 10/1994 | Margolis et al. | 701/23 |
| 5,373,911 | 12/1994 | Yasui | 701/23 |
| 5,390,118 | 2/1995 | Margolis et al. | 701/27 |

FOREIGN PATENT DOCUMENTS

| | | |
|---|---|---|
| 1-180011 | 7/1989 | Japan . |
| 3-286315 | 12/1991 | Japan . |
| 4-12144 | 1/1992 | Japan . |
| 7-182337 | 7/1995 | Japan . |

Primary Examiner—William A. Cuchlinski, Jr.
Assistant Examiner—Gertrude Arthur
Attorney, Agent, or Firm—Evenson, McKeown, Edwards & Lenahan, PLLC

[57] ABSTRACT

Apparatus for automatic transverse vehicle guidance is provided for the automatic transverse guidance of a vehicle along a traffic lane. The apparatus can be activated in such a way using an activating actuation of an operating element that the actual transverse-position value present at the activation instant serves as a desired transverse-position value for subsequent automatic transverse guidance operation.

26 Claims, 1 Drawing Sheet

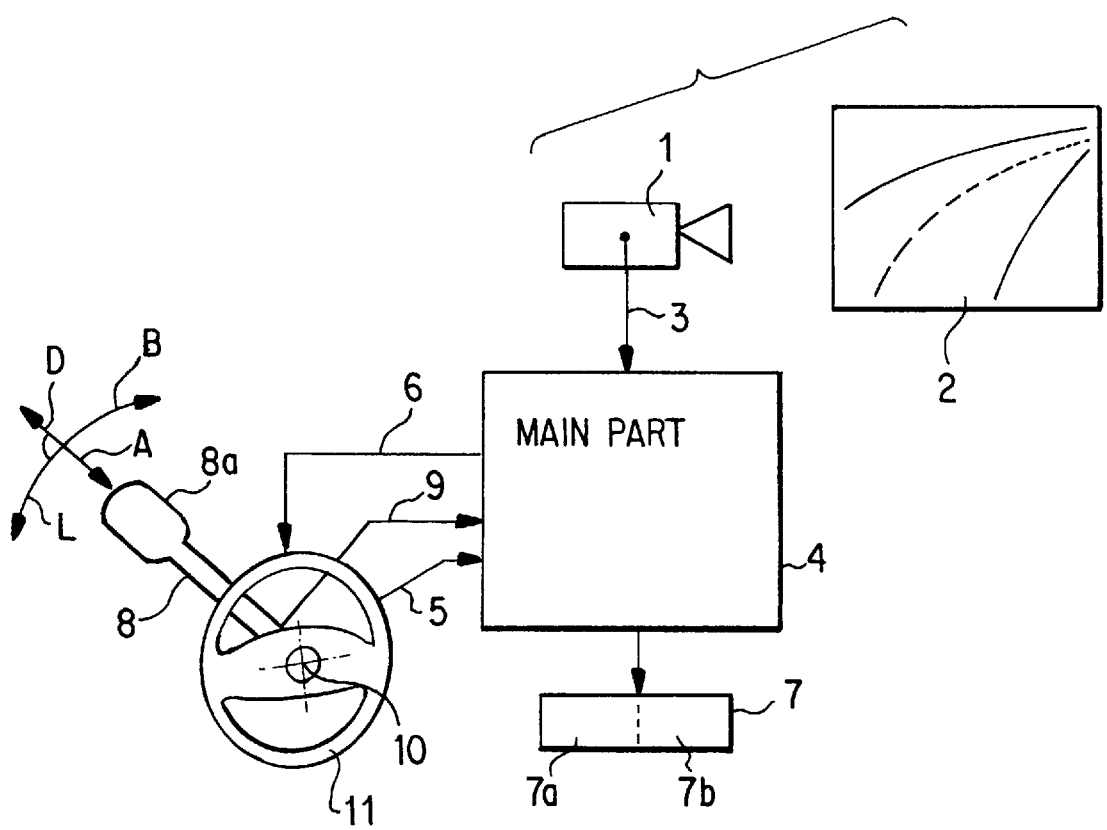

APPARATUS FOR AUTOMATIC TRANSVERSE VEHICLE GUIDANCE ALONG A TRAFFIC LANE

BACKGROUND AND SUMMARY OF THE INVENTION

The invention relates to an apparatus for the automatic transverse guidance of a vehicle along a traffic lane. Apparatuses of this kind are used in road vehicles, for example, to keep the vehicle in a particular traffic lane on a multilane road.

An apparatus of this kind is described in German Patent document DE 43 32 836 C1 (having a corresponding U.S. Pat. No. 5,485,378, the specification of which is expressly incoporated by reference herein). This apparatus is continuously active during driving, assuming that it is ready for operation, and superimposes steering-angle adjustments which stabilize the transverse position upon the steering angle settings effected by the driver. On the one hand, the driver is thereby largely relieved of continual steering interventions and, on the other hand, he or she retains the possibility of intervening in the vehicle steering for larger steering maneuvers, e.g. while changing lane during overtaking or passing maneuvers. As feedback, the exertion of a steering torque by the apparatus on the steering wheel can be provided at the steering wheel with the sense of steering associated with the automatic steering intervention and familiar to the driver. In case there is no vehicle readiness, e.g. because the quality of the images supplied by a video camera recording the roadway is insufficient, the apparatus remains deactivated. In this patent document, it is furthermore explained that, in the case of steering regulation methods implemented in experimental vehicles, it is known for the driver to be able to switch between manual and automatic steering operation.

German Patent document DE 42 21 015 A1 (having an equivalent U.S. Pat. No. 5,245,422) discloses a system for automatic transverse vehicle guidance, the activation of which is linked to the activation of another system in the vehicle for holding the longitudinal speed of the vehicle constant, i.e. a so-called "cruise control". Here, the driver has the possibility either of activating only the cruise control, by means of a first control switch, or activating the cruise control and the automatic transverse vehicle guidance system jointly by actuating a second control switch. The automatic transverse vehicle guidance-system is deactivated as soon as the steering force measured by a driver steering sensor and exerted on the steering wheel by the driver exceeds a specifiable level. As soon as the latter condition is no longer met, the automatic transverse vehicle guidance system is re-activated automatically. The automatic transverse vehicle guidance system can furthermore be switched off by pushing the brake pedal down fully or by actuating a dedicated control switch. When the driver pushes the accelerator pedal down fully, the cruise control can be temporarily overridden, the automatic transverse vehicle guidance system remaining active.

The technical problem underlying the invention is to provide an apparatus for automatic transverse vehicle guidance of the type mentioned above which exhibits a comparatively high degree of convenience in terms of functioning and use.

The present invention solves this problem by providing an apparatus for the automatic transverse guidance of a vehicle along a traffic lane, which can be activated by an activating actuation of an operating element. The actual transverse-position value present at the activation instant serves as a desired transverse-position value for subsequent automatic transverse guidance operation.

This apparatus for automatic transverse guidance of a vehicle along a traffic lane comprises an operating element, actuable by the user, for activating the apparatus such that the actual transverse-position value present at the activation instant serves as a desired transverse-position value for subsequent automatic transverse guidance operation. While conventional transverse vehicle guidance systems generally attempt only to keep the vehicle within the boundaries of the traffic lane by maintaining a specified desired transverse position which is invariable, i.e. to prevent the boundaries of the traffic lane from being crossed, the present apparatus makes it possible for the vehicle user to specify any transverse vehicle position he or she wants as a desired transverse guidance position. For this purpose, he or she brings the vehicle into the corresponding desired transverse position, which can, in particular, be a position on the traffic lane which is further to the right or left, out of center, and then uses the operating element to activate the apparatus for automatic transverse vehicle guidance, which then keeps the vehicle in the desired transverse position.

An apparatus developed in accordance with a preferred embodiment is deactivated automatically when a steering intervention by the driver, which changes the transverse position, occurs. Thereafter, in a first alternative, the apparatus is not automatically re-activated or, in a second alternative, is automatically re-activated only when the monitored transverse vehicle dynamics exhibit a steady-state behavior for a specifiable waiting time, i.e. do not exceed certain tolerance limits as regards the transverse position or the lateral speed to the left and right during this waiting time. This offers safety advantages over the above-mentioned known automatic re-activation when the steering force exerted by the driver has become sufficiently small. This is because, in the case of overtaking maneuvers, there are often periods of time of greater or lesser length in which the driver does not have to exert any force on the steering wheel. Automatic re-activation of the previously deactivated automatic transverse guidance is undesirable at this moment. Moreover, the steering wheel is usually never completely free from forces during cornering, with the result that, in the case of the conventional procedure, re-activation of automatic transverse vehicle guidance can only take place on a sufficiently straight road section. In addition, transverse sloping of the traffic lane requires a small steering deflection, with the result that it is then unclear to the driver when the conventional transverse vehicle guidance system is re-activated after a traffic lane change. A further difficulty of this conventional system consists in that, after a prolonged period of driving with manual steering intervention, the driver may no longer be reckoning with re-activation of the system. All these problems do not occur with the apparatus according to the invention since their re-activation is not coupled to the steering force exerted by the driver and no longer occurs automatically, or occurs as a function of the time profile of the transverse vehicle dynamics.

A further advantageous apparatus offers a particularly high degree of convenience in terms of functioning and use by virtue of the fact that it comprises a multifunction operating element with two sets of two opposing directions of actuation in each case. The first set of opposing directions of actuation serves for the manual activation and deactivation of the apparatus, while the second set of opposing directions of actuation serves for the continuous changing of the desired transverse-position value to the left or right. The last-mentioned function makes it possible for the vehicle user to make continuous changes, as desired, to the desired transverse-position value, which is set to the actual transverse-position value at the instant of activation of the apparatus for automatic transverse guidance. To this end, there is no need for the driver first of all to deactivate the apparatus again and move the vehicle to the corresponding transverse position.

In the case of another advantageous apparatus, the multifunction operating element is configured as an operating lever which, along a first line of actuation, activates the apparatus upon being pulled and deactivates it upon being pushed. Along a second line of actuation, preferably orthogonal to the first, the multifunctional operating element changes the desired transverse-position value to the right by actuation in one direction and changes it to the left by actuation in the other direction.

An advantageous apparatus contains one or more indication elements, each of which indicates to the driver whether the apparatus is ready, i.e. is fundamentally prepared to carry out automatic transverse vehicle guidance and/or whether it is active at that moment. These indications can be given acoustically, optically and/or haptically.

Other objects, advantages and novel features of the present invention will become apparent from the following detailed description of the invention when considered in conjunction with the accompanying drawings.

BRIEF DESCRIPTION OF THE DRAWINGS

The single FIGURE shows a block diagram of an apparatus for the automatic transverse guidance of a road vehicle in a traffic lane according to the present invention.

DETAILED DESCRIPTION OF THE DRAWING

The apparatus shown in the FIGURE continuously optically detects—in particular by means of markings arranged at the edge—a traffic lane 2 along which the vehicle is travelling by means of a vehicle-position detection device 1 in the form of a video camera with an image processing unit connected to its output, and evaluates the data obtained. The output signal 3 of the vehicle-position detection device 1 contains the information on the actual transverse-position value, i.e. the instantaneous distance of a defined vehicle point from a particular traffic lane border, on the instantaneous traffic lane curvature and on the instantaneous yaw-angle difference. This information is fed to a main element 4 of the apparatus, which, inter alia, contains a desired-lane transmitter, a steering regulation device, a speed sensor and an electronic steering unit as a steering-angle setting device. The embodiment of this main element 4 corresponds to one of the embodiments described at length in the above-mentioned patent DE 43 32 836 C1 (U.S. Pat. No. 5,485, 378), and, to avoid unnecessary repetitions as regards the exact construction of the main part 4 of the apparatus, reference can be made to the detailed explanations there.

In particular, the main part 4 of the apparatus links a steering-angle actuating signal 5 produced by the driver by means of a steering wheel 11 with a steering-assistance actuating signal, produced by the apparatus itself which carries out the regulation of a transverse guidance. This is done in such a way that, on the one hand, relatively large steering interventions by the driver remain possible and, on the other hand, relatively small steering corrections for the maintenance of a desired transverse vehicle position are effected automatically by the apparatus, thus relieving the driver of this task. By virtue of the automatic adjustment of the steering angle, the profile of the steering-wheel torque is initially unknown to the driver since a slight adjustment of the steering-wheel angle acting in the same direction as the steering-assistance actuating signal does not lead to an effective steering-angle adjustment but merely to the regulating system reducing the value of the steering-assistance actuating signal accordingly. To compensate for this effect, the main part 4 of the apparatus exerts a steering-wheel torque 6 on the steering wheel 11, and this again imparts to the driver the expected steering feel.

With its vehicle-position detection device 1, the apparatus shown detects the roadway 2 and continuously determines the transverse position of the vehicle and the course of the traffic lane from the roadway edge markings, which are found by a suitable image processing method. If the course of the roadway can be clearly determined, the apparatus signals its readiness to the driver, for which purpose, in the present case, the main part 4 of the apparatus drives an associated first half 7a of a two-part optical display 7 in an appropriate manner, e.g. by a corresponding lamp lighting up only when readiness for operation is present.

In contrast to this continuous testing of readiness for operation, it is envisaged that the apparatus for automatic transverse guidance of the vehicle is only activated, after the beginning of a journey, when this is demanded by the driver. For this purpose and for further operating functions, the apparatus has a multifunction operating lever 8, which is arranged in the vicinity of the steering wheel in the manner of conventional cruise-control operating levers and combines several operating functions. Thus, the activation of the transverse guidance apparatus is performed by pressing on the button 8a of the operating lever 8 parallel to the longitudinal direction of the latter, as represented by a corresponding arrow A in the FIGURE. Via a signal line 9, the activation signal, like all the other signals from the operating lever, is transmitted to the main part 4 of the apparatus.

Upon receipt of the activation signal, the transverse guidance apparatus is activated and, by means of transverse-position regulation, holds the vehicle in that transverse position which was the actual transverse-position value at the instant of activation, treating it as the desired transverse-position value. Optionally, it is possible, for the transverse-guidance regulation, to provide a limitation of the minimum permitted curve radius and/or the maximum permitted lateral acceleration, the driver being warned haptically, acoustically and/or optically when the corresponding limit condition is reached. Consequently, the driver can freely select the initial desired transverse-position value by steering the vehicle into the corresponding transverse position before activating automatic transverse guidance. This position does not have to be central with respect to the traffic lane but can be offset out of center to the right or left. Optionally, provision can be made for the apparatus not to be activated, despite an activation signal triggered by way of the operating lever 8 until it is ready for operation, because, for example, the quality of the images taken of the roadway 2 is not adequate at that moment.

During this phase of automatic transverse vehicle guidance, the steering wheel 11 rotates in accordance with the steering movements of the wheels, the torque imposed by the transverse guidance apparatus guiding the driver's hand on the steering wheel 11, so that the driver has continuous feedback on the activation state of the system. In addition to this haptic indication of the fact that the transverse guidance apparatus is active, an optical indication is provided in this regard, in that the main part 4 of the apparatus correspondingly drives a second half 7b, e.g. a further lamp, of the two-part optical indicator 7 during periods in which it is actively performing transverse guidance. As an alternative to this two-part optical indicator 7, it is also possible for a one-part indicator to be provided. If the transverse guidance apparatus is not ready for operation, this indicator does not light up, while, if the transverse guidance apparatus is ready for operation but in the deactivated state, it lights up in a first color, e.g. yellow, and in a second color, e.g. green, while the apparatus is active. In vehicles with mechanical decoupling of a steering wheel and the steering adjustment device, so-called drive-by-wire steering systems, high-frequency steering corrections on the part of the transverse guidance apparatus can be passed on to the steering wheel after low-pass filtering to serve as haptic feedback. As an alternative, small additive steering angles can be superimposed on the current steering-wheel position.

The automatic transverse guidance apparatus can be deactivated manually by the driver by pulling the operating lever 8 in the direction D opposed to the direction A of activating actuation by pushing. Automatic deactivation of the transverse guidance apparatus takes place, on the one hand, when the roadway detection conditions become unreliable and the readiness for operation of the apparatus is no longer guaranteed, this being indicated to the driver haptically, acoustically and/or optically. Subsequent automatic re-activation of the transverse guidance apparatus when it is again ready for operation is intentionally not provided in order to prevent the apparatus from being activated at a moment which is not foreseeable by the driver and is possibly unfavorable for safe driving. On the contrary, re-activation is only possible by appropriate renewed actuation by pushing the operating lever 8. On the other hand, the transverse guidance apparatus is deactivated when it detects an active movement of the steering wheel 11 by the driver, i.e. when the steering movement of the driver overrides the steering intervention by the apparatus.

For the re-activation of the transverse guidance apparatus after such a switch-off caused by a steering intervention by the driver, two variants can be implemented. In a first variant, as in the above case where readiness for operation is no longer present, automatic re-activation of the, apparatus is not permitted. Reactivation can then be initiated again only manually by the driver, by means of the operating lever 8. This makes it particularly clear for the driver whether automatic transverse guidance is active or not at a particular point in time. In a second variant, in which the emphasis is on ease of operation, the transverse guidance apparatus is re-activated after a previous deactivation, triggered by a steering intervention by the driver, when, by means of its continuously active roadway detection device 1, it detects that the driver is no longer performing any steering interventions that change the transverse position and the vehicle is again following a traffic lane in an essentially steady manner, e.g. after the completion of an overtaking maneuver. Specifically, provision can be made for this detection for continuous determination of the integral of the absolute value of the lateral speed over a certain waiting time, e.g. typically two seconds, and comparison with a specified threshold value. As soon as the threshold value is exceeded, re-activation of the transverse guidance apparatus is enabled, it being possible for the actual re-activation to be coupled to further additional conditions depending on the application, e.g. to whether the roadway detection device detects that the vehicle is at all within a marked traffic lane to be followed.

It is preferable if no further possibilities for the activation and deactivation of the transverse guidance apparatus are provided in addition to those mentioned above. In particular, automatic re-activation of the apparatus when the steering force exerted by the driver slackens does not take place since this can lead to situations which the driver does not understand and which may be unfavorable for driving safety. In addition, there is no deactivation of automatic transverse guidance upon brake actuation, even in the case of sharp braking. This avoids the difficulty that, after a braking operation, the driver is not certain whether the automatic transverse guidance apparatus is still active or not. As regards its state of activation, the automatic transverse guidance apparatus is not coupled to the state of operation of any cruise control additionally provided in the vehicle.

In addition to the two opposing directions of actuation A, D of the operating lever 8 for the activation and deactivation, respectively, of the automatic transverse guidance apparatus, the operating lever 8 has two directions of actuation R, L which are orthogonal thereto and opposed to one another and by means of which, when the automatic transverse guidance apparatus is active, the driver can vary in an infinitely variable manner the desired transverse-position value, i.e. the lateral vehicle position relative to the traffic lane 2, underlying transverse-position regulation. Specifically, he or she can change the desired transverse-position value in the direction of the right-hand boundary of the traffic lane by pulling the operating lever 8 upwards towards the right in the direction of the arrow R shown, i.e. pivoting it about a pivoting axis 10 close to the steering column. Similarly, he or she can change the desired transverse-position value in the direction of the left-hand boundary of the traffic lane by pushing the operating lever 8 downwards towards the left along arrow L, i.e. pivoting it in the opposite direction about the axis 10 of the operating lever. It has been found that this obvious association of the actuating movements of the operating lever with the transverse guidance functions triggered by them is particularly advantageous for the driver. It is self-evident that one or more operating elements, such as buttons, etc., of a different kind, possibly integrated into an operating lever of the type shown can be provided for the functions of activation and deactivation of the transverse guidance apparatus and adjustment of the desired transverse-position value as an alternative to the operating lever 8 shown.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An apparatus for automatic transverse guidance of a vehicle along a traffic lane using information on an actual transverse position value of the vehicle output from a vehicle position detection device, the apparatus comprising:

an operating element which is actuated at an activation instant to activate said apparatus;

wherein the actual transverse-position value of the vehicle with respect to the traffic lane present at an activation instant of the operating element serves as a desired transverse-position value for subsequent automatic transverse guidance operation.

2. The apparatus according to claim 1, wherein said apparatus is deactivated automatically when a steering intervention by a driver of the vehicle occurs which changes a transverse position, and wherein said apparatus is not automatically re-activated after said deactivation, or is automatically re-activated only when the transverse position of the vehicle exhibits a steady-state behavior for a specified waiting time.

3. Apparatus according to claim 2, wherein said operating element is a multi-function operating element comprising a first set of opposing actuation directions for an activation and deactivation of said apparatus, and a second set of opposing directions for an actuation which continuously changes the desired transverse-position value to the right or left.

4. Apparatus according to claim 3, wherein said multi-function operating element exercises the activation function upon being pulled and a deactivation function upon being pushed along a first line of actuation and, along a second line of actuation triggers a change in the desired transverse-position value to the right by actuation in one direction and a change in the desired transverse-position value to the left by actuation in the other direction.

5. The apparatus according to claim 2, further comprising at least one indication element for indicating whether said apparatus is in at least one of a state of readiness and an activated state.

6. Apparatus according to claim 1, wherein said operating element is a multi-function operating element comprising a first set of opposing actuation directions for an activation and deactivation of said apparatus, and a second set of opposing directions for an actuation which continuously changes the desired transverse-position value to the right or left.

7. The apparatus according to claim 6, wherein said multifunction operating element exercises the activation function upon being pulled and a deactivation function upon being pushed along a first line of actuation and, along a second line of actuation triggers a change in the desired transverse-position value to the right by actuation in one direction and a change in the desired transverse-position value to the left by actuation in the other direction.

8. The apparatus according to claim 7, further comprising at least one indication element for indicating whether said apparatus is in at least one of a state of readiness and an activated state.

9. The apparatus according to claim 6, further comprising at least one indication element for indicating whether said apparatus is in at least one of a state of readiness and an activated state.

10. The apparatus according to claim 1, further comprising at least one indication element for indicating whether said apparatus is in at least one of a state of readiness and an activated state.

11. The apparatus according to claim 1, wherein the automatic transverse guidance apparatus maintains the actual transverse-position value serving as the desired transverse-position value constant.

12. The apparatus according to claim 1, wherein activation of the automatic transverse guidance apparatus is independent of a vehicle speed control system.

13. The apparatus according to claim 1, wherein the actual transverse-position value of the vehicle serving as the desired transverse-position value can be anywhere within the traffic lane.

14. An automatic transverse guidance apparatus for transversely guiding a vehicle along a traffic lane, comprising:
an operating element coupled to the automatic transverse guidance apparatus;
means for determining an actual transverse-position value present at an activation instant of said operating element;
means for obtaining a desired transverse-position value for subsequent automatic transverse guidance operations, wherein said actual transverse-position value of the vehicle with respect to the traffic lane present at the activation instant serves as the desired transverse-position value for subsequent automatic transverse guidance operations.

15. The apparatus according to claim 14, further comprising:
means for deactivating the automatic transverse guidance apparatus automatically when a steering intervention by a driver which changes the actual transverse-position value occurs;
means for not automatically re-activating the automatic transverse guidance apparatus after the above deactivating step.

16. The apparatus according to claim 15, further comprising only means for only automatically re-activating the automatic transverse guidance apparatus when the actual transverse-position of the vehicle exhibits a steady-state behavior for a predetermined waiting time.

17. The apparatus according to claim 14, wherein the automatic transverse guidance apparatus maintains the actual transverse-position value serving as the desired transverse-position value constant.

18. The apparatus according to claim 14, wherein activation of the automatic transverse guidance apparatus is independent of a vehicle speed control system.

19. The apparatus according to claim 14, wherein the actual transverse-position value of the vehicle serving as the desired transverse-position value can be anywhere within the traffic lane.

20. Method of operating an automatic transverse guidance apparatus of a vehicle which automatically transversely guides said vehicle along a traffic lane, the method comprising the steps of:
activating the automatic transverse guidance apparatus via an activating actuation movement of an operating element;
determining an actual transverse-position value of the vehicle with respect to the traffic lane present at an activation instant;
performing subsequent automatic transverse guidance operation of the vehicle using the actual transverse-position value as the desired transverse-position value.

21. The method according to claim 20, further comprising the steps of:
automatically deactivating the automatic transverse guidance apparatus when a steering intervention by a driver changes a transverse position of the vehicle; and
automatically re-activating the automatic transverse guidance apparatus only when the transverse position of the vehicle exhibits a steady-state behavior for a specified waiting time after said deactivating step.

22. The method according to claim 20, wherein the step of performing subsequent automatic transverse guidance operation of the vehicle maintains the actual transverse-position value serving as the desired transverse-position value constant.

23. The method according to claim 20, wherein the activating step is independent of a vehicle speed control system.

24. A computer product comprising a computer readable medium having stored thereon a program for automatic transverse guidance of a vehicle along a traffic lane, said program including code segments which determine an actual transverse-position value of the vehicle with respect to the traffic lane present at an activation instant of the automatic transverse guidance apparatus, and subsequently perform automatic transverse guidance operation using the actual transverse-position value as the desired transverse-position value.

25. The computer product according to claim 24, wherein said program code segments further automatically deactivate the automatic transverse guidance apparatus when a steering intervention by a driver changes a transverse position of the vehicle, and only automatically re-activate the automatic transverse guidance apparatus when the transverse position of the vehicle exhibits a steady-state behavior for a predetermined waiting time.

26. The computer product according to claim 24, further comprising a code segment which maintains the actual transverse-position value serving as the desired transverse-position value constant during the automatic transverse guidance operation.

* * * * *